United States Patent [19]

Meckel

[11] 4,399,479
[45] Aug. 16, 1983

[54] THIN FILM MAGNETIC HEAD HAVING GOOD LOW FREQUENCY RESPONSE

[75] Inventor: Benjamin B. Meckel, Del Mar, Calif.

[73] Assignee: Eastman Kodak Company, Rochester, N.Y.

[21] Appl. No.: 231,201

[22] Filed: Feb. 4, 1981

[51] Int. Cl.³ .......................... G11B 5/22; G11B 5/16; G11B 5/42

[52] U.S. Cl. .................................. 360/126; 29/603; 360/119; 360/122

[58] Field of Search ............... 360/126, 125, 119, 120, 360/110, 121, 122; 29/603

[56] References Cited

U.S. PATENT DOCUMENTS

| Re. 29,326 | 7/1977 | Lazzari et al. | 360/123 |
| 2,325,844 | 8/1943 | Fischer | 360/125 |
| 2,543,483 | 2/1951 | Barrett | 360/123 |
| 2,635,149 | 4/1953 | Cain | 360/118 |
| 2,653,189 | 9/1953 | Camras | 360/121 |
| 2,697,754 | 12/1954 | Ranger | 360/125 |
| 2,832,839 | 4/1958 | Muffly | 360/119 |
| 4,219,854 | 8/1980 | Church et al. | 360/123 |
| 4,219,855 | 8/1980 | Jones, Jr. | 360/125 |

FOREIGN PATENT DOCUMENTS 52-74321 6/1977 Japan ........................ 29/603

Primary Examiner—Alfred H. Eddleman
Attorney, Agent, or Firm—Robert F. Cody

[57] ABSTRACT

To provide a thin film magnetic head having good low frequency response, the invention teaches the use of a movable mask technique whereby a first deposited magnetic film is provided with a tapered, or knife-, edge. Gap spacer material is then deposited on the film knife-edge. Thereafter, a second magnetic film is deposited atop the knife-edge, as well as on the same substrate that supports the first magnetic film. What results, therefore, is a slant gap thin film magnetic head having good low frequency response.

3 Claims, 13 Drawing Figures

PHOTORESIST STEP

REMOVE PHOTORESIST

008
THIN FILM MAGNETIC HEAD HAVING GOOD LOW FREQUENCY RESPONSE

FIELD OF THE INVENTION

This invention relates in general to magnetic heads and to methods of making magnetic heads. More particularly though, the invention provides a thin film magnetic playback head having good low frequency response.

The invention, as well as the prior art, will be discussed below with reference to the figures, wherein.

DESCRIPTION RELATIVE TO THE PRIOR ART

Figure 1:
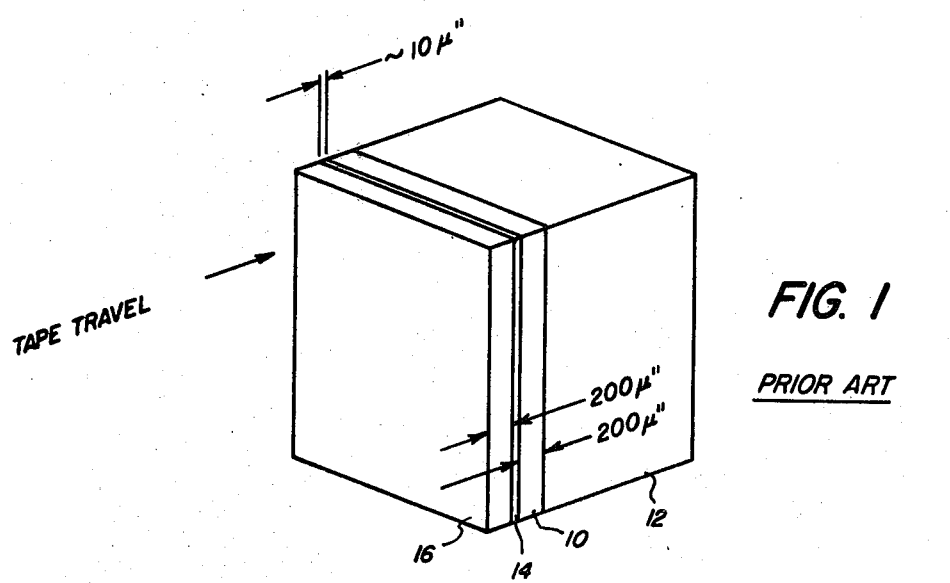
FIG. 1 is a perspective view of a prior art thin film magnetic head structure.

Whereas the high frequency response of a gapped magnetic head is directly dependent on the length of its head gap, low frequency response depends on the length of the head pole pieces which cooperatively couple with (e.g. contact) the recording medium being played. These phenomena are well known; and accordingly, conventional magnetic playback heads are made with relatively large pole pieces and extremely short gaps.

There is, currently, a trend toward the manufacture of new types of magnetic heads employing thin film pole structures and gap spacers. Representative prior art is indicated in U.S. Pat. Nos. 4,219,854; 4,219,855; and U.S. Pat. No. Re. 29,326.

Prior art thin film magnetic heads inherently have poor response at low frequencies, the pole pieces thereof being lengthwise the same as the extremely small thicknesses of the films which they employ. That this is so may be appreciated from FIG. 1 which depicts a representative prior art thin film magnetic head structure over which the invention provides improvement. In the making of a head structure as in FIG. 1, a first thin film 10 of magnetic material is deposited, by any of a variety of ways, onto a non-magnetic substrate 12. The film 10 thickness is typically about 200$\mu''$ ($\mu''$=microinch). Non-magnetic gap spacer material 14, e.g. SiO, is then deposited over the magnetic film to an extremely small thickness of just a few microinches, e.g. 10$\mu''$. Then, a second thin film 16 of magnetic material is deposited over the gap spacer material 14, the thin film 16 being typically 200$\mu''$ thick. Electromagnetic coupling to the thin films 10, 16 may be made in any of a variety of ways, whereby magnetic signals coupled into the thin films may be converted to electrical signals.

Since, as is known, a transducer gap, in order to effect playback of signals recorded in a magnetic medium such as magnetic tape, must be oriented across the direction of relative tape travel, the head pole pieces, i.e. the films 10, 16 of the FIG. 1 head structure, can only contact the tape over a distance of about twice 200$\mu''$. This means that the low frequency response of the head structure of FIG. 1 is limited to recorded wavelengths shorter than 200$\mu''$ (Magnetic Recording, by Charles E. Lowman, McGraw-Hill Book Co., 1972, pg. 82) and, in view of the gap-defining high frequency response limitation to recorded wavelengths longer than 10$\mu''$ (*Magnetic Recording*, by Charles E. Lowman, McGraw-Hill Book Co., 1972, pg. 77), a playback head according to the general structure of FIG. 1 would inherently be limited to narrow band usage.

PROBLEM DEFINITION

Figure 2:
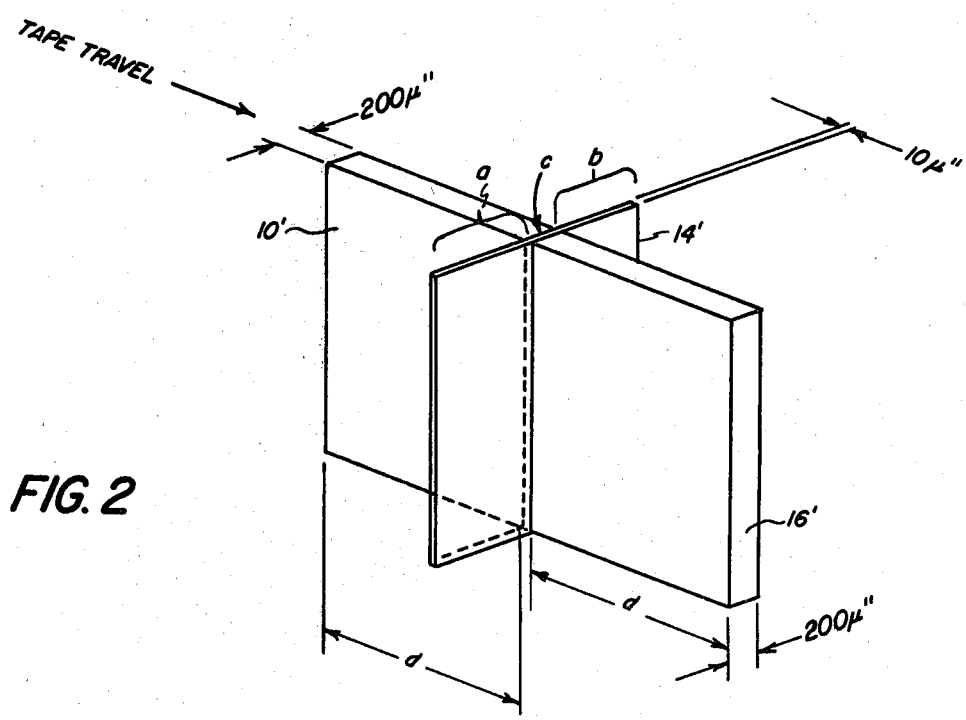
FIG. 2 is a diagram, in perspective, which is useful in illustrating a concept of the invention.

To provide good low frequency response in a thin film magnetic head might suggest an orientation of the head thin films in the manner schematically indicated in FIG. 2. (Parts depicted in FIG. 2 having corresponding parts in FIG. 1 are primed.) With such film orientation, the low frequency response thereof would be limited by the magnetic film dimensions d; and such dimensions could clearly be as great as desired. (The high frequency response would not be different from that of the structure of FIG. 1; but clearly the film 14' regions a,b could be eliminated since they serve no transducer function.)

Orientating the films 10', 14', 16' as in FIG. 2 is, however, more easily said than done: Bearing in mind that the films 10' and 16' are deposited films (and would typically be on the same support) the possibility of depositing a 10$\mu''$ wide film c of SiO (on that same support) between the films 10', 16' is virtually nil. There is, in addition, no known way that a 200$\mu''$ (or so) film (e.g. 10') can be coated with SiO, to a thickness of 10$\mu''$, along an edge of the film 10', and then bonded to a second 200$\mu''$ film (i.e. film 16') with the SiO between the two 200$\mu''$ films, when both 200$\mu''$ films reside on the same substrate.

SUMMARY OF THE INVENTION

To provide a thin film magnetic head having good low frequency response, the invention teaches the use of a movable mask technique whereby a first deposited magnetic film is provided with a tapered, or knife-, edge. Gap spacer material is then deposited on the film knife-edge. Thereafter, a second magnetic film is deposited atop the knife-edge, as well as on the same substrate that supports the first magnetic film. What results, therefore, is a slant gap thin film magnetic head having good low frequency response. Slant gap heads are well known to be operative devices, as discussed in the following references: U.S. Pat. Nos. 2,325,844; 2,543,483; 2,635,149; 2,653,189; 2,697,754; and 2,832,839.

METHOD OF MAKING A MAGNETIC HEAD EMBODYING THE INVENTION

Figure 3:
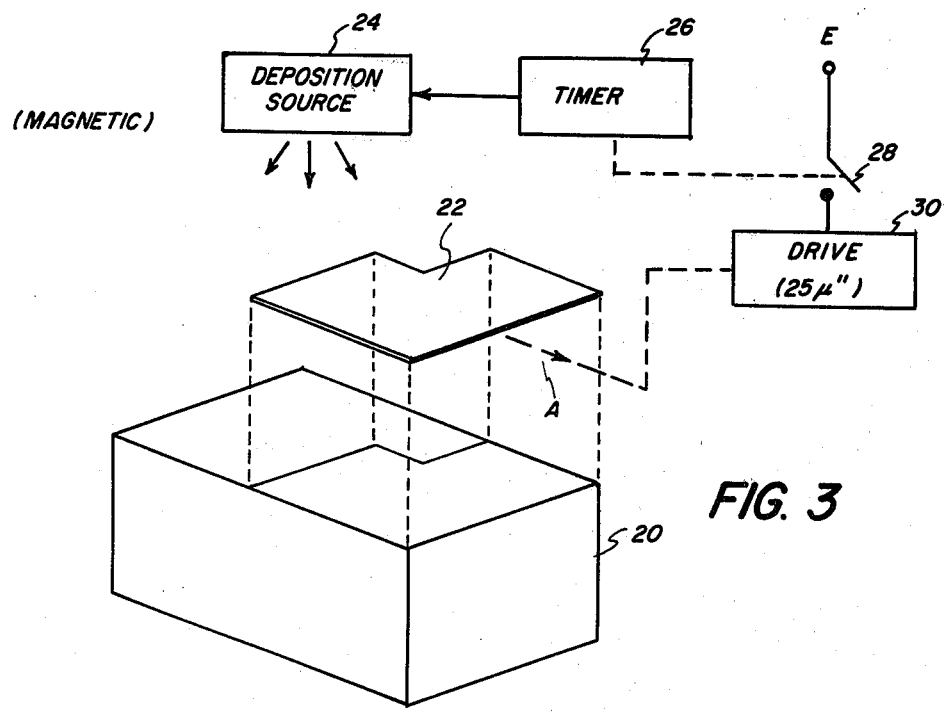
FIGS. 3 through 13 illustrate, in perspective, various procedural steps which are employed to produce a magnetic head incorporating the invention.

Referring to FIG. 3, a non-magnetic substrate 20, lying in the shadow of a mask 22, is exposed to a source 24 of magnetic material. The source 24 deposits a film of magnetic material, e.g. permalloy, on the substrate 20 by any of several known processes such as vacuum depositing or sputtering. Film thickness control is effected by means of a timer 26.

At the moment the deposited magnetic film (31, FIG. 4) builds to a suitable thickness of, say, 200$\mu''$, the timer 26 actuates a switch 28, which applies power E to a drive motor 30 coupled to the mask 22 to position the mask. The coupling of the motor 30 to the mask is via a precision linkage forming no part of the invention. In positioning the mask 22, the drive motor 30, very slowly, and uniformly, moves the mask in the direction of the FIG. 3 arrow A for a distance, typically, of 25$\mu''$. As a result, a contoured film having a knife-edge 32 gets deposited on the substrate 20. See FIG. 4.

Figure 4:
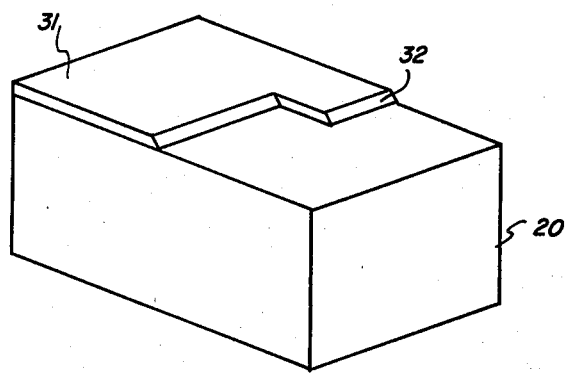
Figure 5:
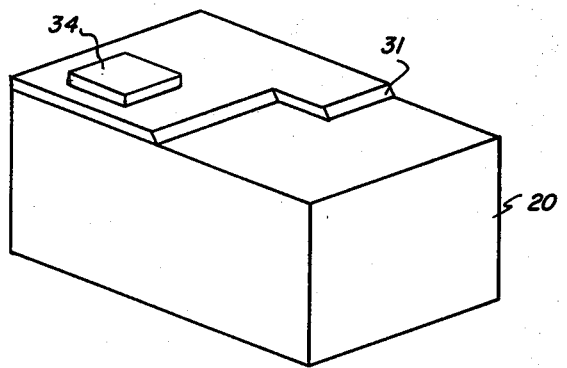

The structure of FIG. 4 is then coated with photoresist; exposed through a suitable mask; and photographically developed to produce the structure of FIG. 5—and which figure indicates the existence of a hardened photoresist mask 34 atop the magnetic film 31.

Figure 6:
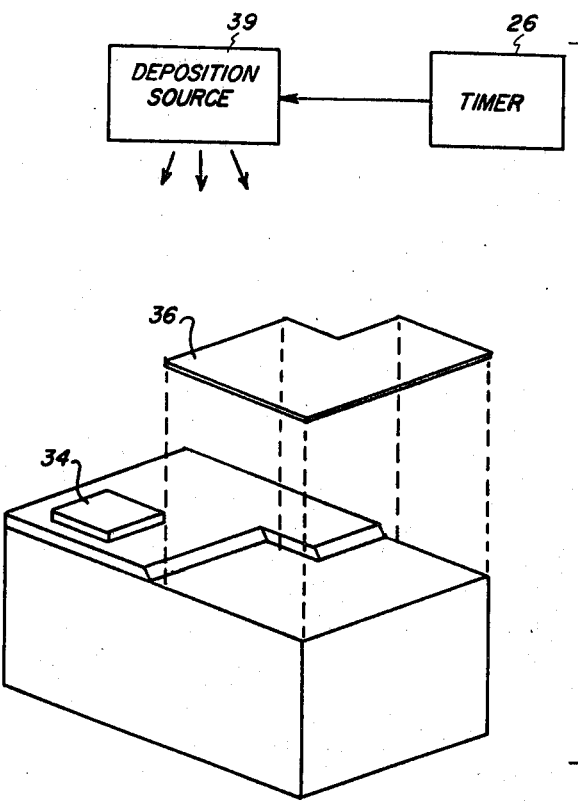
Figure 7:
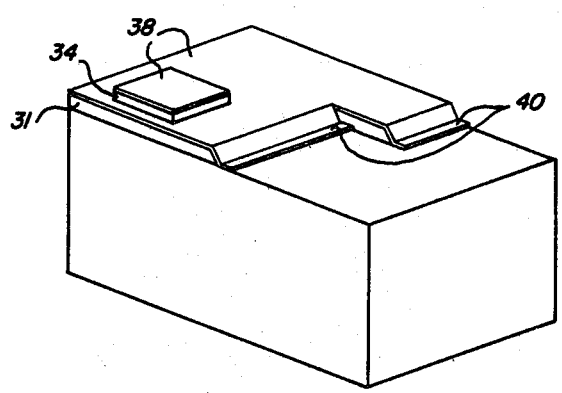

With a suitably positioned mask 36 in place (FIG. 6), and under control of the timer 26, a $10\mu''$ thick film 38 of SiO (FIG. 7) is deposited, by a source 39 thereof, over the photoresist 34 and the magnetic film 31. To be noted is that the mask 36 of FIG. 6 is different from (i.e. smaller than) the mask 22 of FIG. 3 in that it allows some SiO to get deposited on the substrate 20. See, in particular, the region 40 of FIG. 7.

Figure 8:
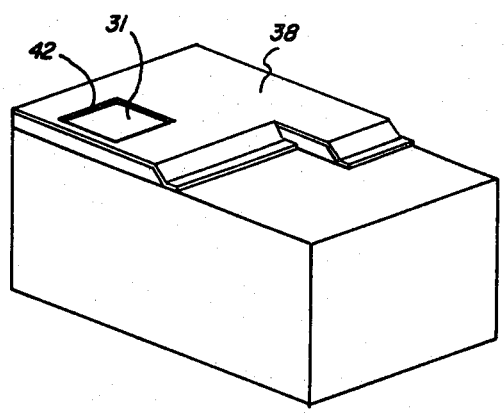

The photoresist 34, along with its SiO overcoat, is then removed by chemical means known to the art, leaving a well 42 (FIG. 8), in the SiO film 38, that extends to the underlying magnetic film 31.

Figure 9:
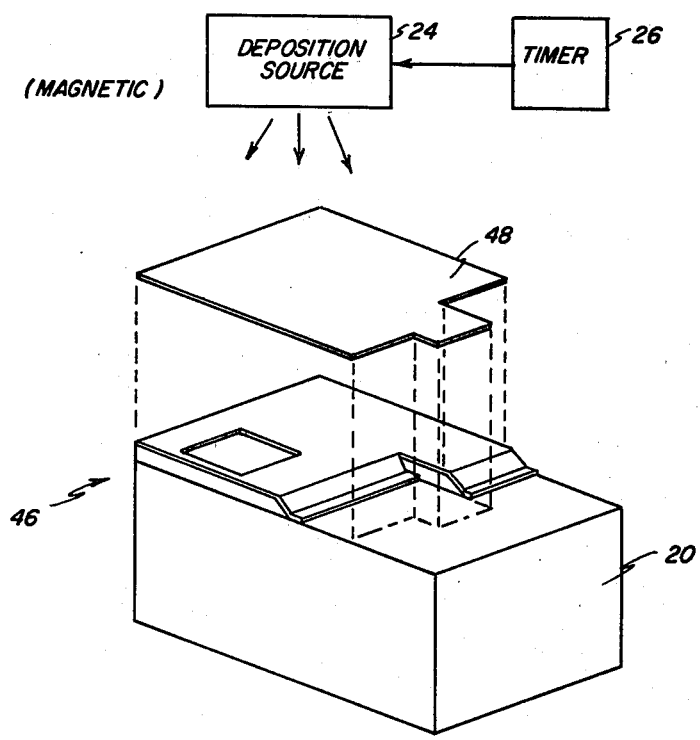

Again the substrate 20 (FIG. 9) is exposed to the film producing source 24 of magnetic material, only this time a mask 48 is employed to shield the superstructure 46 residing on the substrate 20. As a result, a magnetic film 50, topographically following the unshielded part of the substrate 20, is produced, the film thickness—typically $200\mu''$—being controlled, as above, by the timer 26.

At this point in the description of the inventive process, it is believed to be desirable to address the matter of "scale": In none of the figures hereof is a correct scale employed, for to do so would obscure the matter of film topography. With this in mind, it will be appreciated that the upstanding parts 52 of the film 50 only extend two ten-thousandths beyond the plane of the SiO film 38; and, as such, can (if at all) barely be felt by human touch.

Figure 10:
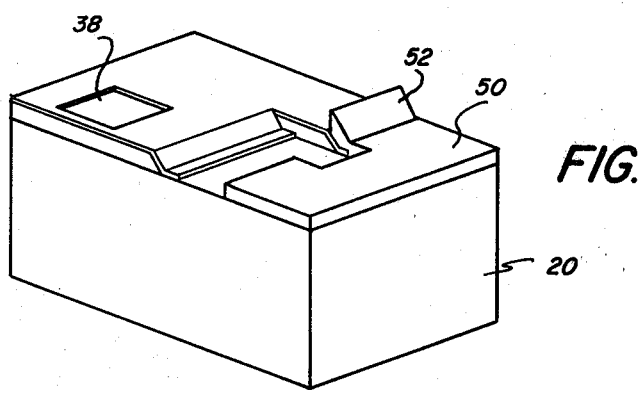
Figure 11:
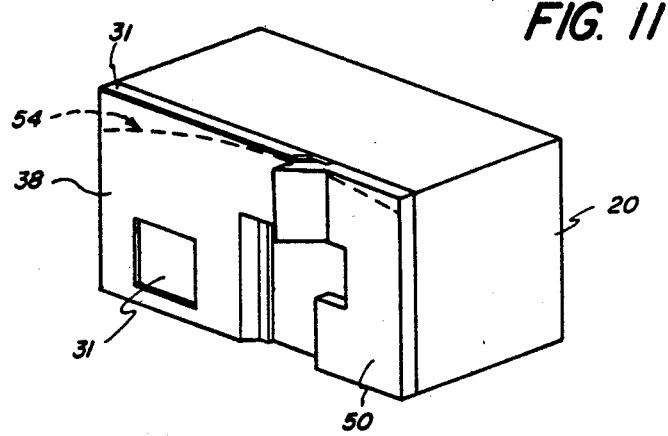
Figure 12:
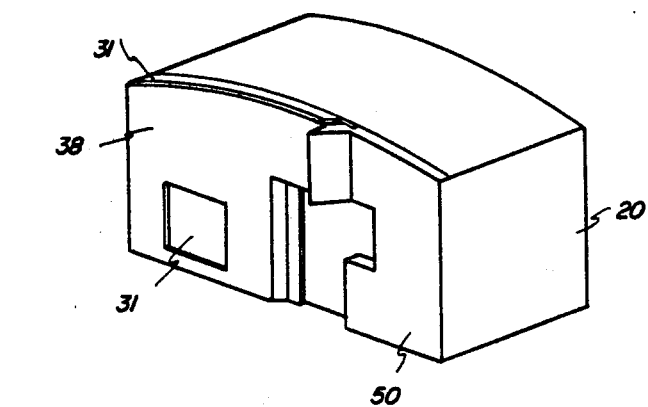

Reference should now be had to FIG. 11 which shows the structure of FIG. 10 readied for contouring along the contour line 54. Contouring may be achieved by use of either, or both, abrasive webs being run over the FIG. 11 structure, or by a suitably shaped substrate 20 to start with, and by use of complementary masks during the film deposition procedures. In any event, having produced the contoured head structure of FIG. 12, a magnetic yoke member 58 (FIG. 13), with an electrical coil coupled thereto, is connected to the FIG. 12 structure so as to complete the magnetic circuit which extends from the magnetic film 50, through the yoke 58 to the magnetic film 31 and, via a non-magnetic SiO gap 62 (i.e. the head transducer gap), back to the magnetic film 50.

Figure 13:
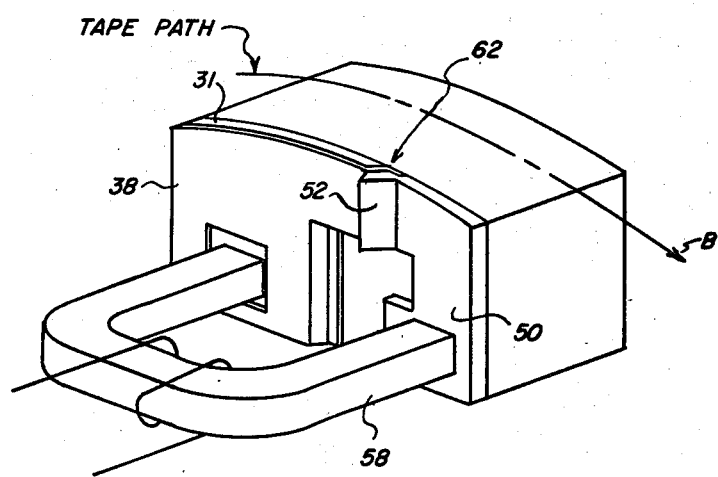

As will be appreciated from FIG. 13, with relative tape-to-head travel as indicated by the arrow B, the (good) low frequency response of the FIG. 13 thin film head will be controlled by the relatively large pole dimensions (which as above noted may be as great as desired); and the (good) high frequency response of the FIG. 13 head will be controlled by the extremely small dimension of the transducer slant gap 62. The wideband performance of the FIG. 13 head, therefore, contrasts favorably with the performance of prior art thin film heads which are inherently limited to narrow band usage—the low frequency response of prior art thin film heads being controlled not by film width, but by film thickness.

The invention has been described in detail with particular reference to preferred embodiments thereof, but it will be understood that variations and modifications can be effected within the spirit and scope of the invention. For example, if desired, the upstanding parts 52 of FIGS. 10–13 may be lapped down; and, if desired, a non-magnetic protective coat may be applied to protect the integrity of the films 38 and 50.

What is claimed is:

1. A structure useful in a thin film magnetic head having good low frequency response comprising
    (a) a non-magnetic support having a generally planar surface,
    (b) a first generally planar thin film of magnetic material deposited on a first part of said planar surface and having at least one tapered edge thereof,
    (c) a thin film of non-magnetic material deposited on both said tapered edge of said first thin film of magnetic material and over at least part of the planar surface thereof, and
    (d) a second generally planar thin film of magnetic material deposited on a second part of the surface of said non-magnetic support and upon said non-magnetic film on said tapered edge of said first thin film of magnetic material, said thin films of magnetic material constituting the poles of said magnetic head structure and said thin film of non-magnetic material defining a slanted transducer gap between said poles, part of said thin film of non-magnetic material being further deposited on said second part of the planar surface of said non-magnetic support so as to reside beneath said second thin film of magnetic material in proximity of said transducer gap, thereby to lessen the chance of inadvertent magnetic short circuiting of flux across said slanted transducer gap from one head structure pole to the other.

2. The structure of claim 1 including yoke means magnetically coupled
    (a) to said first thin film of magnetic material at a location thereof that is distant with respect to said slanted transducer gap, and
    (b) to said second thin film of magnetic material at a location thereof that is also distant with respect to said slanted transducer gap.

3. The magnetic head structure of claim 2 wherein said magnetic films are comprised of permalloy material and said film of non-magnetic material is comprised of silicon oxide.

* * * * *